US005940644A

United States Patent [19]

Putora

[11] Patent Number: 5,940,644

[45] Date of Patent: Aug. 17, 1999

[54] BALANCING APPARATUS FOR STABILIZING CAMERA MOVEMENT

[76] Inventor: Ivan Putora, 450B Scarborough Golf Club Road, Unit 111, Scarborough, Ontario, Canada, M1G 3V7

[21] Appl. No.: 09/064,129

[22] Filed: Apr. 22, 1998

[51] Int. Cl.$^6$ .............................................. G03B 17/24

[52] U.S. Cl. .............................................. 396/421

[58] Field of Search .............................. 396/50, 420, 421, 396/428

[56] References Cited

U.S. PATENT DOCUMENTS

| | | | |
|---|---|---|---|
| 2,945,428 | 7/1960 | Dearborn | 396/421 |
| 4,017,168 | 4/1977 | Brown . | |
| 4,247,067 | 1/1981 | Smith . | |
| 4,907,768 | 3/1990 | Masseron et al. . | |
| 4,952,953 | 8/1990 | Ridderstolpe et al. . | |
| 5,033,705 | 7/1991 | Reagan . | |
| 5,098,182 | 3/1992 | Brown | 396/421 |
| 5,177,516 | 1/1993 | Fitz et al. . | |
| 5,243,370 | 9/1993 | Slater . | |
| 5,670,783 | 9/1997 | Ray . | |
| 5,742,859 | 4/1998 | Acker | 396/421 |

OTHER PUBLICATIONS

Photocopy of a flyer entitled "The Dual Porta–Jib The Losmandy Dolly", by Cineasst.

Photocopy of Porta–Jib by Losmandy.

Photocopy of Weaver/Steadman Multi Axis Jib Arm, untitled (4 pages).

*Primary Examiner*—David M. Gray
*Attorney, Agent, or Firm*—Bereskin & Parr

[57] ABSTRACT

Apparatus for stabilizing unwanted movement of a video camera during tilting, panning, zooming and other camera operations. The stabilizing apparatus includes an elongated balance arm, a pivotal support for supporting the balance arm about a fulcrum point, a camera mount, and a counterweight having a center of gravity below the fulcrum point. The camera mount and counterweight are shaped to position the combined center of gravity of the camera mount with camera and counterweight below the fulcrum point of the balance arm.

21 Claims, 5 Drawing Sheets

BALANCING APPARATUS FOR STABILIZING CAMERA MOVEMENT

FIELD OF THE INVENTION

This invention relates to camera movement stabilizing devices, and more particularly, to devices for stabilizing hand-held video cameras during operation.

BACKGROUND OF THE INVENTION

There exists a need to minimize unwanted camera motion, which tends to occur when an operator moves a video camera or other motion picture camera during operation. There exist a number of prior art camera stabilizing devices, including those shown in U.S. Pat. Nos. 4,010,618, and 5,243,470. However, these prior art devices tend to be relatively complex and costly.

Newer video cameras are equipped with optical or electronic image stabilizing systems, which suppress jiggle caused by the operator's hands shaking. However, these systems do not prevent the camera image from becoming slanted, as the operator moves about.

SUMMARY OF THE INVENTION

The present invention is accordingly directed to apparatus for stabilizing unwanted movement of a camera during tilting, panning, zooming and other special camera operations. The apparatus comprises an elongated balance arm having a longitudinal axis, a front camera end and a back counterweight end, a pivotal support for pivotally supporting the balance arm at a fulcrum point between the front end and the back end, a camera mount coupled to the front end of the balance arm shaped to position a camera of known camera mass a selected axial distance from the fulcrum point, and a counterweight coupled to the back end of the balance arm having a counterweight mass selected to counterbalance the camera mass when the counterweight is positioned a selected counterweight distance from the fulcrum point. The counterweight has a centre of gravity located below the longitudinal axis of the balance arm. The counterweight and camera mount are shaped such that when the camera mass is counterbalanced, the apparatus has a combined centre of gravity located directly below the fulcrum point. As a result, the balance arm assumes a relatively stable, balanced equilibrium position during camera operation.

The present invention is also directed to apparatus for reducing unwanted camera movement during operation. The apparatus comprises an elongated housing having a longitudinal axis, a front housing portion, a middle housing portion and a rear housing portion, and pivotal support means pivotally supporting the housing at a fulcrum point between the front housing portion and the rear housing portion. The front housing portion is configured and sized to house a camera lens a selected distance from the fulcrum point. The rear housing portion is configured and sized to house a counterweight a given distance from the fulcrum point, which counterbalances the front housing portion. The counterweight having a centre of gravity located below the longitudinal axis. The apparatus assumes a balanced horizontal equilibrium position during operation, and the combined centre of gravity of the housing is located directly below the fulcrum point.

BRIEF DESCRIPTION OF THE DRAWINGS

This invention will now be described, with reference to the following drawings, in which like reference numerals refer to like parts, and in which.

DETAILED DESCRIPTION OF THE PREFERRED EMBODIMENTS

Figure 1:
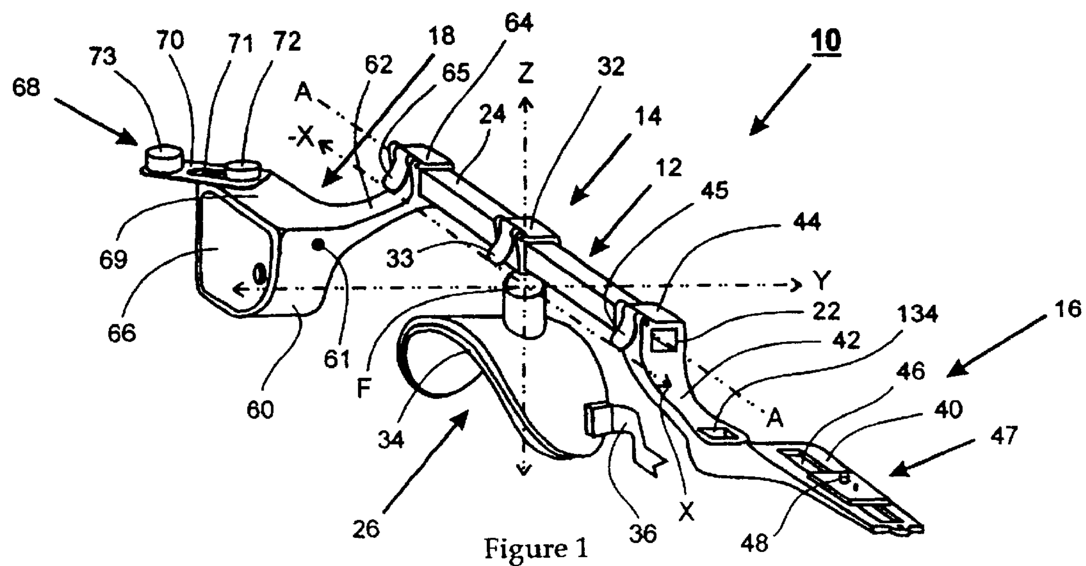
FIG. 1 is a perspective view of a preferred embodiment of a camera stabilizing apparatus made in accordance with the subject invention.
Figure 2:
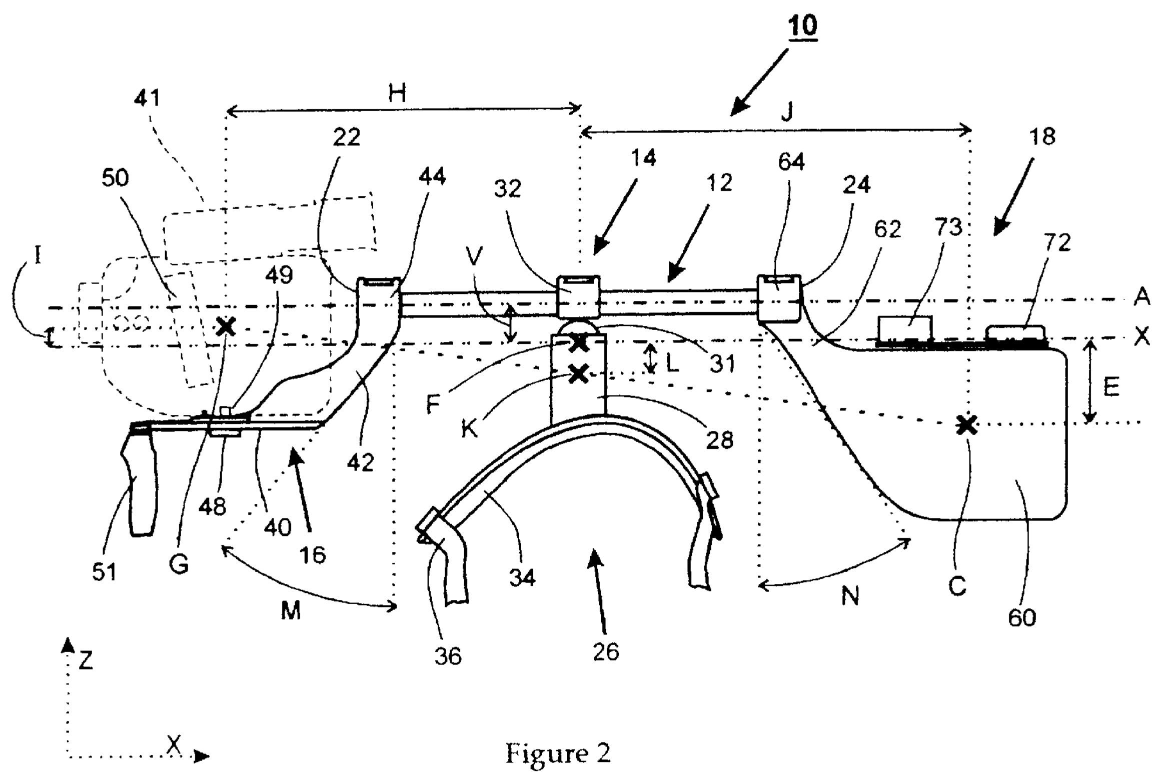
FIG. 2 is a side elevational view of the preferred embodiment, showing in ghost lines a camera mounted thereon.
Figure 3:
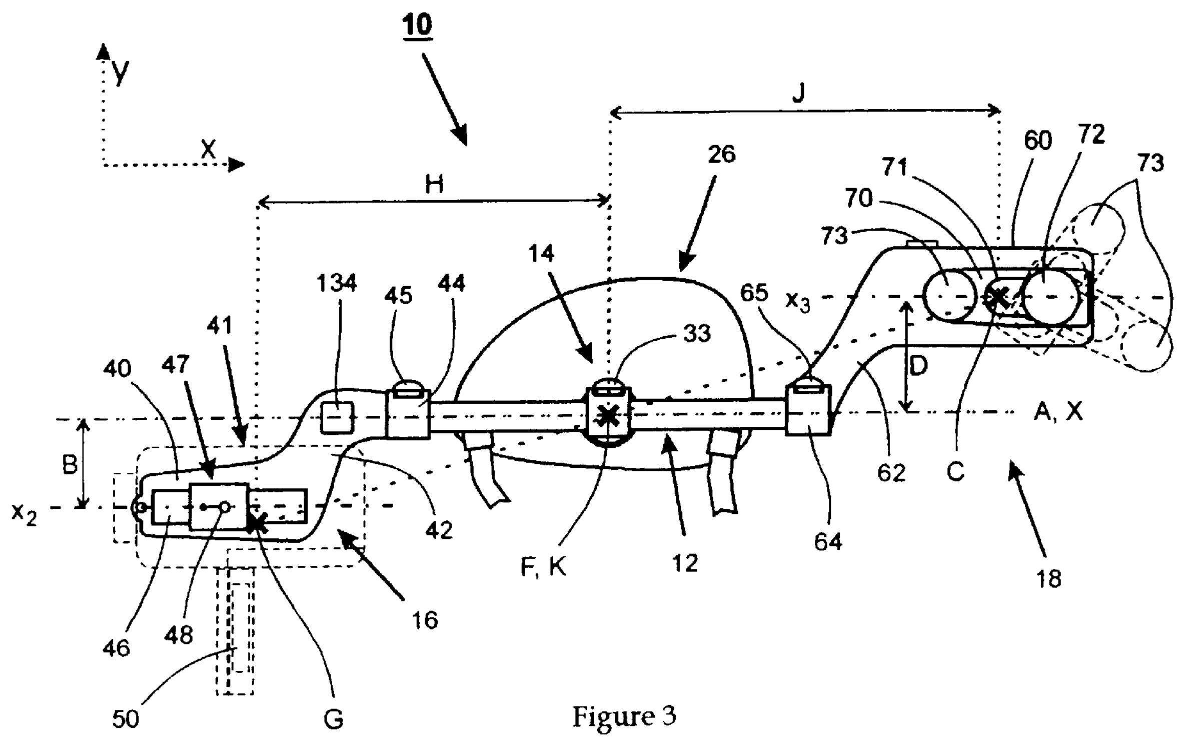
FIG. 3 is a top plan view of the preferred embodiment shown in FIG. 2.

Referring to FIGS. 1, 2 and 3, illustrated therein is camera movement stabilizing apparatus 10 made in accordance with a preferred embodiment of the invention. Camera stabilizing apparatus 10 comprises balance arm 12, pivotal support 14, camera mount 16, and counterweight 18. Balance arm 12 is preferably an elongated metal tube 20 of square cross-section, having longitudinal axis A, front camera end 22 and back counterweight end 24.

Pivotal support 14 pivotally supports balance arm 12 at fulcrum point F located between front end 22 and back end 24 of balance arm 12. Pivotal support 14 comprises column 28 extending upwardly from shaped shoulder rest 26, and pivotal coupling means 30 in the form of ball 31 attached to moveable arm coupler 32 which fits into a socket formed in the top of support column 28. Arm coupler 32 is slideably received on balance arm 12, and axially movable over a range of positions mid-way between front camera end 22 and back counterweight end 24. Arm coupler 32 includes latch 33 which locks arm coupler 32 into place on balance arm 12. Shoulder rest 26 is shaped to conform to the contour of an operator's shoulder, and preferably includes padding 34 and strap 36.

Camera mount 16 comprises a camera base 40 adapted to support camera 41 shown in ghost lines. Camera base 40 is connected to balance arm 12 by a shaped connecting arm 42. Camera base 40 is preferably a rectangular bracket having a longitudinal slot 46 parallel to longitudinal axis A of balance arm 12. Connecting arm 42 is shaped to curve away from longitudinal axis A such that longitudinal slot 46 is offset from longitudinal axis A by a transverse distance B. Camera fastening assembly 47 is slideably received within slot 46 of camera base 40. Camera fastening assembly 47 comprises a bolt 48 threaded into camera shoe 49, which is attached to the underside of camera 41. Connecting arm 42 is releasably coupled to balance arm 12, by slideable arm coupler 44, having an aperture sized and configured to slideably receive the camera end 22 of balance arm 12, and a locking mechanism including latch 45 which locks arm coupler into place on balance arm 12. Guide handle 51 depends from the front of camera base 40.

Counterweight 18 comprises a counterweight body 60 connected to balance arm 12 by connecting arm 62 provided with slideable arm coupler 64 at one end thereof, having a locking mechanism including latch 65. Arm coupler 64 allows a user to slide counterweight body 60 axially along balance arm 12 to a location which balances the weight of camera 41. Connecting arm 62 is shaped to curve laterally away from and below balance arm 12 such that the centre of gravity C of counterweight 18 is offset both laterally from and below longitudinal axis A. Connecting arm 62 is laterally offset from longitudinal axis A or parallel axis X in order to crossbalance the offset camera mount 16 which is diagonally on the opposite site of the longitudinal axis A. This "cross-balance" structure tends to dampen or suppress any twisting movement about the X axis which occurs when an operator ceases lateral movement of apparatus 10 during filming operation. Offset arm 62 also provides clearance between counterweight 18 and the back of the operator's shoulder if shoulder-operated, or clearance for the operator's right arm, if hand operated.

Counterweight 18 preferably includes auxiliary counterweight mechanism 68 mounted on the top 69 of counterweight body 60, which allows the user to fine-tune the balance point. Auxiliary counterweight mechanism 68 comprises a relatively small counterweight 73 mounted on one end of a flat rectangular plate coupled to counterweight top 69 by a fastener having a user-manipulatable knob 72, located in an axial slot 71. Small counterweight 73 can be positioned by the user so as to fine tune the balance achieved by the positioning of counterweight body 60, by sliding and rotating plate 70 relative to counterweight body 60.

Counterweight body 60 is preferably a housing having a hollow interior which can be accessed through side door 66. Counterweight body 60 preferably configured and sized so as to accommodate a load which counterbalances the weight of typical video cameras. The load could consist of heavy metal bars, or preferably, a battery pack, battery charger or other video camera accessories. As shown in FIG. 1, counterweight body preferably includes a battery-out plug 61, allowing the camera to be electrically connected to the battery pack by a cable, without opening side door 66.

Connecting arm 42 of camera mount 16 preferably forms an angle M with the vertical of between 40 degrees and 65 degrees, with the optimal angle being about 50 degrees. This shaping allows the operator to tilt balance arm 12 down at a reasonable angle, without touching the operator's body with camera base 40. Similarly, connecting arm 62 of counterweight 18 is shaped so as to form an angle N with the vertical of approximately 30 to 45 degrees. This shaping prevents the counterweight 18 from touching the operator's shoulder, when the camera is tilted up.

Connecting arm 42 is preferably shaped such that when camera 41 is mounted on camera base 40, the camera centre of gravity G is located a short distance I above fulcrum point F, so as to suppress or dampen any pendulum effect (i.e. a back-and-forth swinging motion about the Y axis) caused when an operator suddenly stops moving apparatus 10 during filming operations.

Stabilizing apparatus 10 is balanced as follows. Pivotal support 14 is positioned by releasing latch 33 of arm coupler 32 and by sliding pivotal support 14 along balance arm 12 to a location approximately mid-way between ends 22, 24, and by then locking latch 33, thereby setting the axial position of fulcrum point F. As shown in FIG. 1, fulcrum point F is located at the origin of an X-Y-Z coordinate system, a short vertical distance V below longitudinal axis A. As shown, longitudinal axis A extends along the Z axis a distance V in the X direction above the origin. Camera 41 is then mounted on camera base 40 by tightening fastening assembly 47, and camera mount 16 is slid along axis A by releasing and latching arm coupler 44, thereby positioning the centre of gravity G of camera 41 at an axial distance H from fulcrum point F, and a vertical distance I above the fulcrum point F. Once the position of camera 41 is set, counterweight 18 is slid axially along balance arm 12 by operating latch 65 of coupler 64, to position which counterbalances the weight of camera 41 about fulcrum point F, thereby positioning the centre of gravity C of counterweight 18 an axial distance J and a vertical distance E from fulcrum point F. Fine-tuning of the balance point may also be achieved by repositioning pivotal support 14. Final fine-tuning of the balance point, mainly around the X axis, may be achieved by adjusting auxiliary counterweight mechanism 68.

When apparatus 10 is thus balanced, balance arm 12 assumed a horizontal equilibrium orientation along longitudinal axis A, and the combined centre of gravity K of the camera mount 16 with camera 41 and the counterweight 18, determined by a line joining camera centre of gravity G with the counterweight centre of gravity C, is located a vertical distance L below fulcrum point F. This geometry results in a natural stabilizing effect, because when the motion of the operator causes the camera mount 16 move away from horizontal orientation, gravitational forces cause apparatus 10 to return to its horizontal equilibrium position. Distance L is preferably relatively small, e.g. about ½ to 1 inch for the apparatus having the dimensions shown in FIGS. 1–3, so as to minimize the aforesaid pendulum effect.

During operation, stabilizing apparatus 10 is placed on a camera operator's shoulder. The operator can then walk about hands fee for the most part. Special camera movements such as panning, tilting, zooming or twisting, can be achieved using guide handle 51. Camera 41 preferably includes monitor screen 50, as shown in FIG. 3, which allows the operator to monitor the camera's field of view at a distance.

Figure 4:
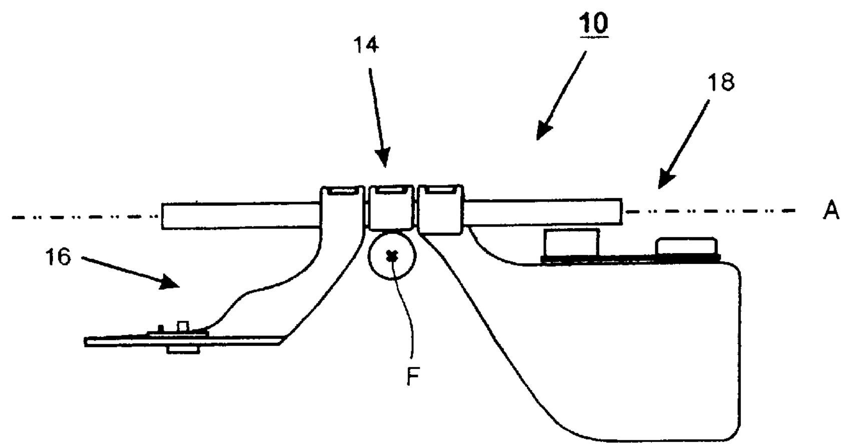
FIG. 4 is a side elevational view of a portion of the preferred embodiment, with the camera mount and counterweight shown in retracted position.

Referring to FIG. 4, camera stabilizing apparatus 10 is shown without pivot support 14, in a transport position, in which camera mount 16 and counterweight 18 have been slid along longitudinal axis A towards fulcrum point F.

Figure 5:
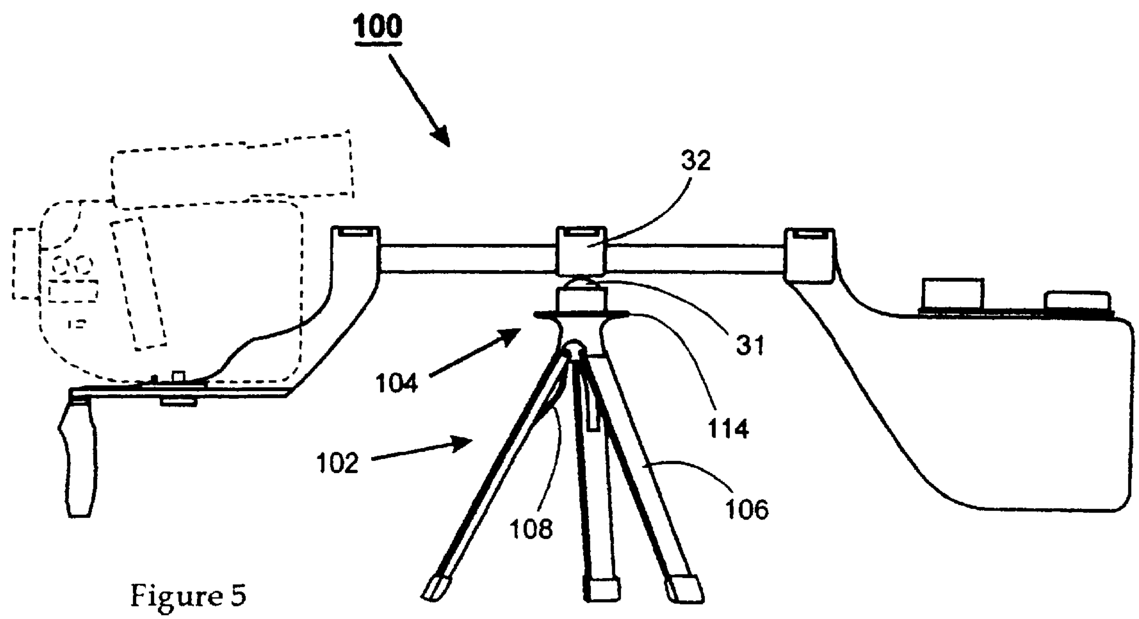
FIG. 5 is a side elevational view of an alternative embodiment, having a pivotal support in the form of a tripod.
Figure 6:
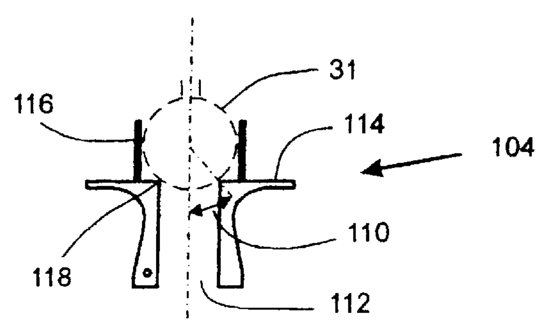
FIG. 6 is a detailed sectional view of the pivotal connection means of the alternative embodiment shown in FIG. 5.
Figure 7:
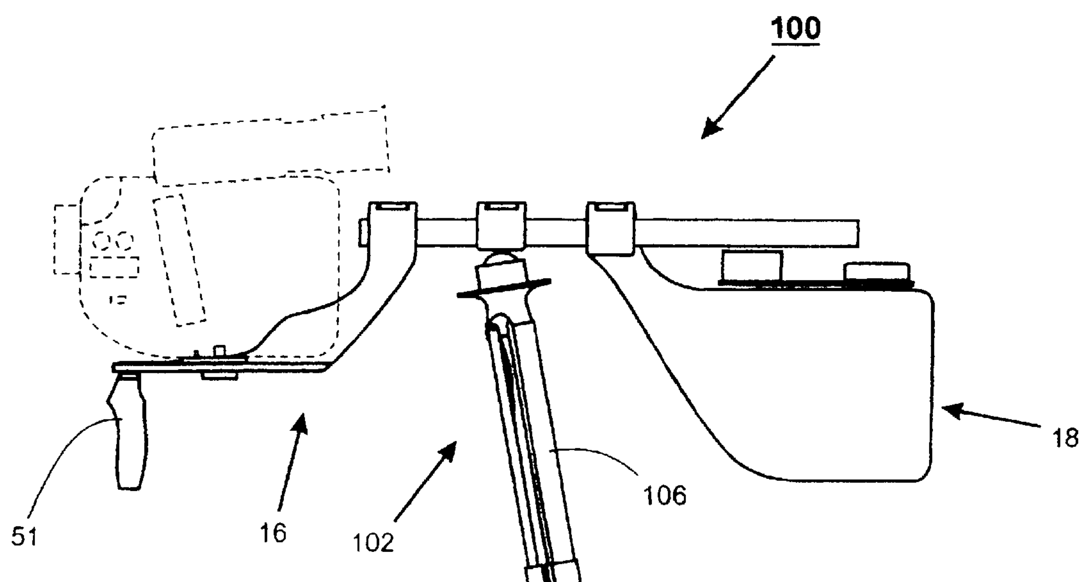
FIG. 7 is a side elevational view of the alternative embodiment shown in FIG. 5, showing the tripod in retracted position.

Referring now to FIGS. 5, 6 and 7, in an alternative embodiment of the present invention, illustrated therein is camera movement stabilizing apparatus 100 which is similar to stabilizing apparatus 10, except that apparatus 100 comprises pivotal support means in the form of a hand hold tripod 102, rather than a shoulder rest. Hand hold tripod 102 has a joint head 104 comprising a socket shaped to receive ball 31 of coupler 32. Tripod 102 also comprises three legs 106 which are biased outwardly by springs 108.

As shown is FIG. 6, joint head 104 comprises a generally cylindrical sleeve 110 having a central bore 112 and transversely extending circular flange 114. Socket walls 116 extend vertically upwardly from the top of flange 114 and form a cup sized for receiving ball 31. The diameter of the cup is preferably about 0.5 mm larger than the diameter of ball 31. The inside edge 118 of sleeve 110 provides a circular holding bearing surface for ball 31. Preferably, the angle between the centre of ball 31 and edge 118 is about 40 degrees plus or minus 5 degrees. Below holding flange 114, the outside surface of sleeve 110 is smoothly radiused so that an operator can, comfortably hold joint head 104 by placing his thumb and finger up against the bottom of flange 114.

Referring to FIG. 7, stabilizing apparatus 100 is shown in its hand-held position, with tripod legs 106 in their retracted position, which allows tripod 102 to be held by the operator. Preferably, counterweight 18 and camera mount 16 are slid towards fulcrum F, to reduce unwanted rotational motion during hand held operation. In use, a right handed operator would typically hold tripod 102 in his right hand, and guide handle 51 in his left hand.

Figure 8:
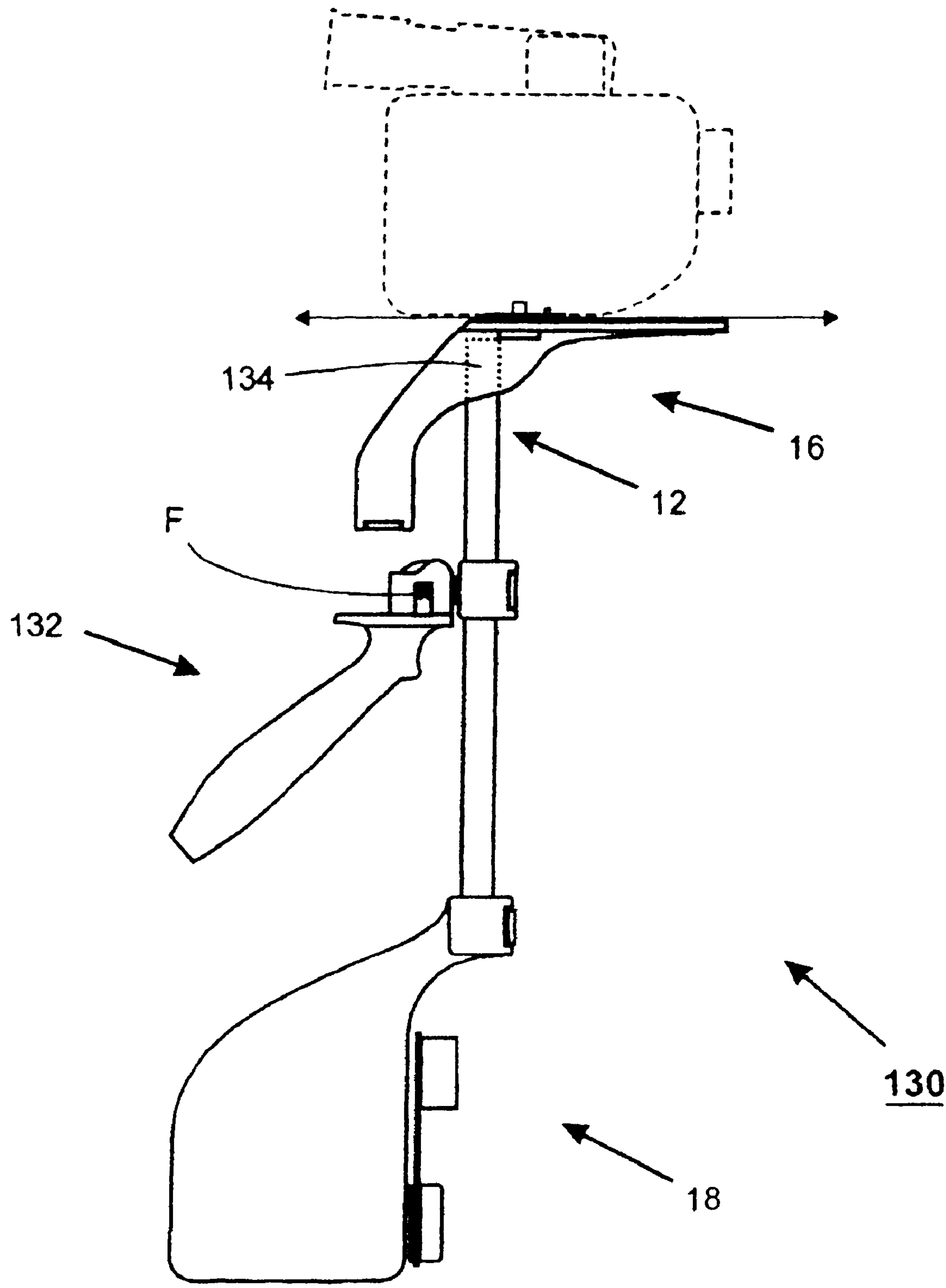
FIG. 8 is a side elevational view of another alternative embodiment, having a pivot support in the form of an angled handle.

Referring now to FIG. 8, in a further alternative embodiment, camera stabilizing apparatus 130 comprises pivotal support means in the form of angled hand grip 132. Otherwise, stabilizing apparatus 130 is similar to apparatus 10. Angled hand grip 132 allows stabilizing apparatus 130 to be used not only in the standard horizontal orientation, but also in the vertical orientation shown in FIG. 8, with counterweight 18 hanging below fulcrum point F. Conversion from horizontal to vertical orientation is achieved by removing camera mount 16 from balance arm 12, turning camera connecting arm 42 by 90 degrees, and sliding connection arm 42 onto balance arm 12 through the aperture in auxiliary coupler 134.

Figure 9:
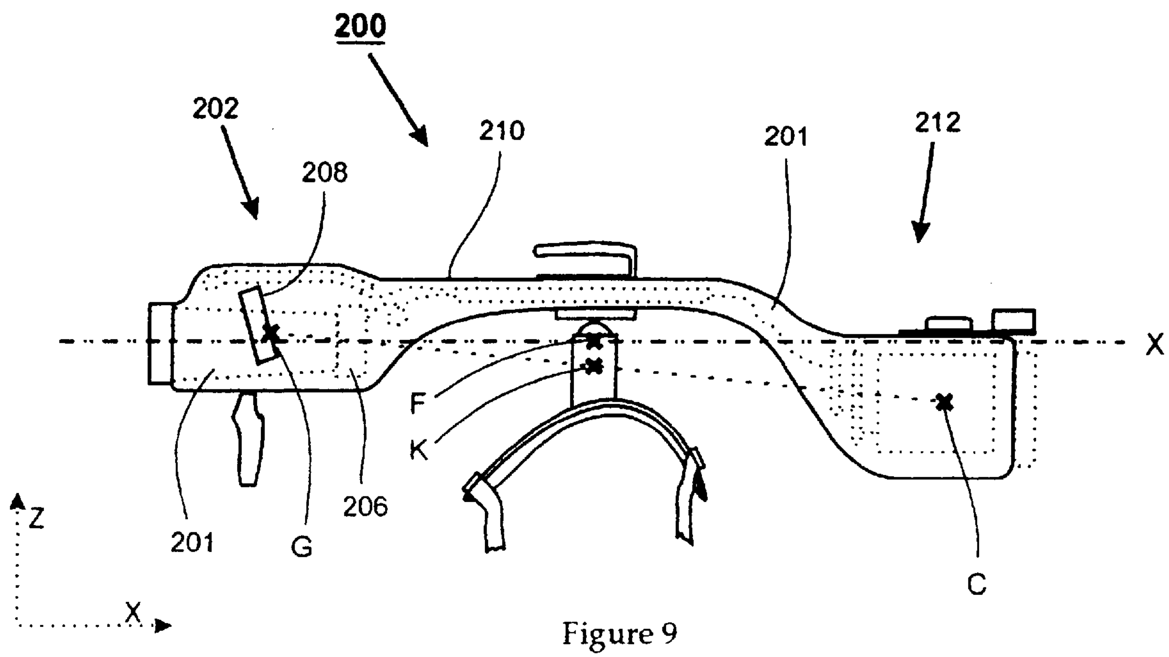
FIG. 9 is a side elevational view of a further alternative embodiment, having an integral camera.
Figure 10:
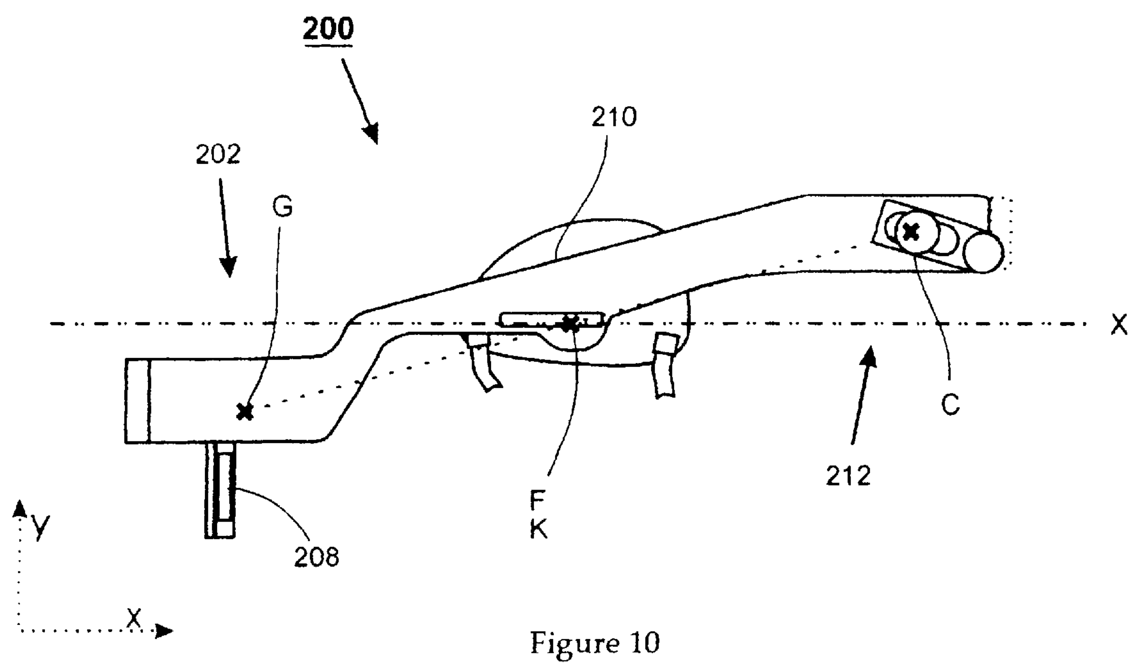
FIG. 10 is a top plan view of the further alternative embodiment shown in FIG. 9.

Referring now to FIGS. 9 and 10, shown therein is a further alternative embodiment of the invention, comprising stabilizing apparatus 200, which is adapted to house separate components of a video camera in a balanced fashion. Apparatus 200 comprises a hollow shaped body 201 having a front housing portion 202 configured to house the lens 204 with camera CCD (Charge Coupler Device) unit 206 and view finder screen 208, a central arm portion 210, and a rear counterweight housing 212 shaped to house the rest of the electronics, the recorder mechanism, and optional battery pack. Central arm portion 210 is provided with one or more passageways to accommodate electronic cables connecting CCD unit 206 and view finder screen 208 to the rest of the electronic housed in counterweight 212. This embodiment reduces the overall weight to approximately one-half the weight of the preferred embodiment. The geometry of alternative embodiment 200 is essentially the same as the geometry of preferred embodiment 10.

It should be understood that various changes can be made to the preferred and alternative embodiments of the invention disclosed herein, without departing from the subject invention the scope of which is defined in the appended claims.

I claim:

1. Apparatus for stabilizing the movement of a camera during operation, comprising:

(a) an elongated balance arm having a longitudinal axis, a front end and a back end;

(b) pivotal support means for pivotally supporting the balance arm at a fulcrum point between the front end and the back end;

(c) a camera mount coupled to the front end of the balance arm shaped to position a camera of known camera mass a selected camera axial distance from the fulcrum point, the camera mount and camera together having a camera centre of gravity; and (d) a counterweight coupled to the back end of the balance arm having a counterweight mass selected to counterbalance the camera mass when the counterweight is positioned a selected counterweight distance from the fulcrum point, the counterweight having a counterweight centre of gravity located below the longitudinal axis of the balance arm, the counterweight and camera mount being shaped such that when the camera mass is counterbalanced, the apparatus has a combined centre of gravity located directly below the fulcrum point.

2. The apparatus defined in claim 1, wherein the camera mount is shaped to position the camera centre of gravity a selected vertical distance equal to or above the fulcrum point.

3. The apparatus as defined in claim 1, wherein the camera mount is shaped to offset the camera mass a selected transverse distance from one side of the longitudinal axis of the balance arm, and the counterweight is shaped to offset the counterweight mass another selected transverse distance from the other side of the longitudinal axis of the balance arm, whereby the counterweight mass cross-balances the camera mass.

4. The apparatus defined in claim 1, further comprising counterweight coupling means for releasably adjustably coupling the counterweight to the balance arm for movement along the longitudinal axis thereof.

5. The apparatus as defined in claim 4, further comprising camera mount coupling means for releasably adjustably coupling the camera mount to the balance arm for movement along the longitudinal axis thereof.

6. The apparatus defined in claim 1, wherein the counterweight depends rigidly from the back end of the balance arm.

7. The apparatus defined in claim 1, wherein the counterweight comprises a counterweight body connected to the balance arm by a shaped counterweight connecting arm.

8. The apparatus as defined in claim 7, wherein the counterweight connecting arm comprises an arm coupler having an aperture sized to slidably receive the balance arm and locking means for locking the arm coupler an adjustable distance from the fulcrum point.

9. The apparatus as defined in claim 7, wherein the counterweight body comprises a housing having a hollow interior and a door for gaining access to the interior.

10. The apparatus defined in claim 1, wherein the camera mount comprises a camera bracket connected to the balance arm by a shaped camera connecting arm.

11. The apparatus defined in claim 1, wherein the balance arm comprises a bar having a cross-section of pre-selected shape.

12. The apparatus defined in claim 1, wherein the pivotal support means comprises a support member and a ball and socket joint between the support member and the balance arm at the fulcrum point.

13. The apparatus as defined in claim 1, wherein the pivotal support means also comprises a shoulder support shaped to fit over the user's shoulder, a column extending upwardly from the shoulder support, a releasably securable arm coupler configured to slide axially along the balance arm, and a ball and socket joint between the arm coupler and the column.

14. The apparatus as defined in claim 12, wherein the support means comprises a tripod having legs movable between an extended position and a collapsed position, wherein the legs form a hand grip in the collapsed position.

15. The apparatus defined in claim 1, wherein the connecting arms are slanted downwardly relative to the longitudinal axis of the balance arm.

16. The apparatus defined in claim 5, further comprising a second arm coupling means for releasably coupling the camera connecting arm to the balance arm in an orientation orthogonal to the longitudinal axis.

17. The apparatus defined in claim 7, wherein the counterweight also includes fine-tuning means for fine-tuning a balance point achieved by positioning the counterweight along the longitudinal axis, the fine-tuning means comprising a relatively small weight slidably and rotatably coupled to the counterweight body.

18. Apparatus for reducing unwanted camera movement during operation, comprising:

(a) an elongated housing having a longitudinal axis, a front housing portion, a middle housing portion and a rear housing portion;

(b) pivotal support means pivotally supporting the housing at a fulcrum point between the front housing portion and the rear housing portion;

(c) wherein the front housing portion is configured and sized to house a camera lens a selected distance from the fulcrum point;

(d) wherein the rear housing portion is configured and sized to house a counterweight a given distance from the fulcrum point which counterbalances the front housing portion, the counterweight having a centre of gravity located below the longitudinal axis, wherein the apparatus assumes a balanced horizontal equilibrium position during operation, and the combined centre of gravity of the housing is located directly below the fulcrum point.

19. The apparatus defined in claim 18, wherein the front housing portion has a centre of gravity located a vertical distance above the fulcrum point.

20. The apparatus defined in claim 18, wherein the front housing portion is transversely offset to one side of the longitudinal axis, and the rear housing portion is transversely offset to the other side of the longitudinal axis so as to cross-balance the front housing portion.

21. The apparatus defined in claim 18, wherein the middle housing portion is provided with at least one longitudinal passageway connecting the front housing portion with the rear housing portion.

* * * * *